W. Kelly.
Manuf. of Iron & Steel.
No. 505. Reissued Nov 3 1857.
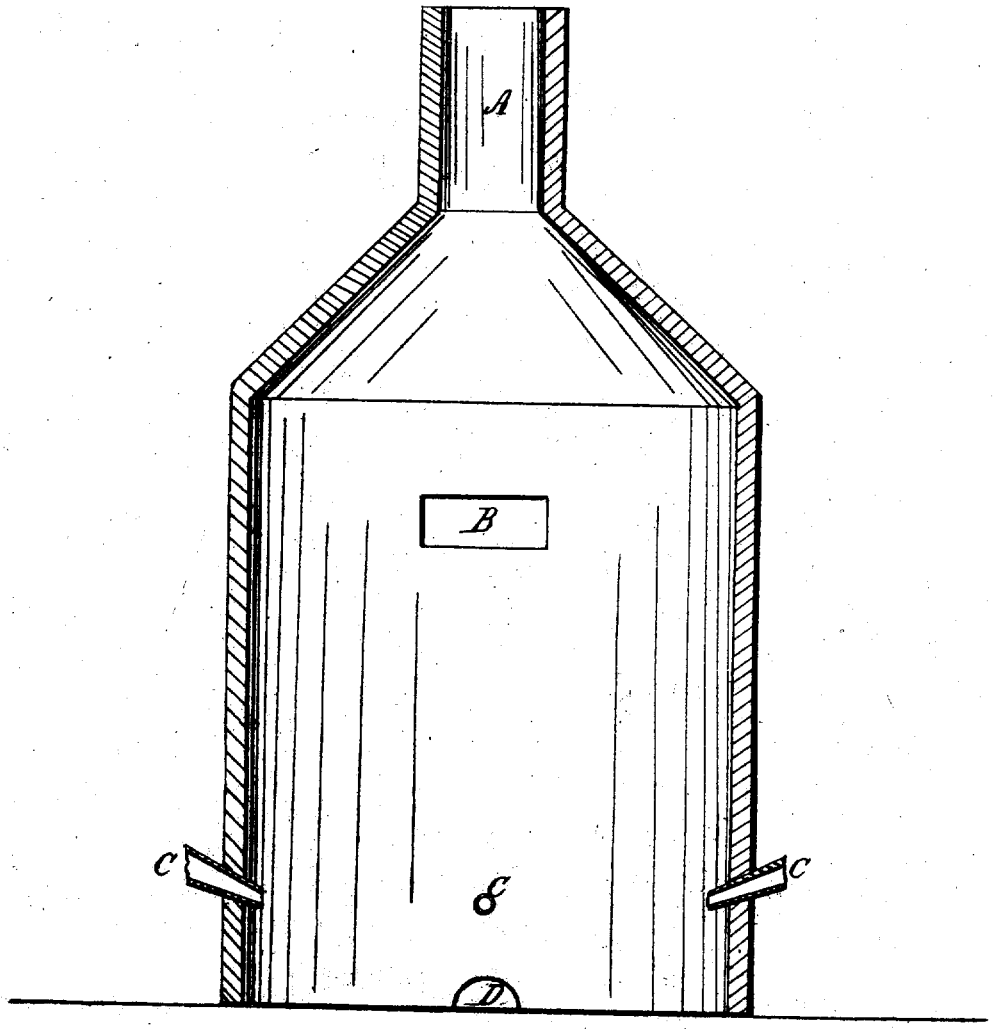

BEST AVAILABLE COPY

UNITED STATES PATENT OFFICE.

WILLIAM KELLY, OF LYON COUNTY, KENTUCKY.

IMPROVEMENT IN THE MANUFACTURE OF IRON.

Specification forming part of Letters Patent No. 17,628, dated June 23, 1857; Reissue No. 505, dated November 3, 1857.

*To all whom it may concern:*

Be it known that I, WILLIAM KELLY, of Lyon county, Kentucky, have discovered a new and improved method of treating iron, by which I am enabled to refine and decarbonize crude pig metal or iron in a fluid state without the use of fuel, of which the following is a specification.

The nature of my invention consists in the discovery that the carbon mechanically combined with the iron, and which is borrowed from the fuel while in the process of smelting in the blast furnace, is of itself (the carbon) sufficient when combined with the oxygen of the air to create heat enough, and of sufficient intensity, to keep the melted pig iron or metal in a fluid or lively state long enough to carry the metal through, without chilling, all the various manipulations of refining without the aid of any other heat than that produced by the above-described chemical union of oxygen and carbon.

I am aware that it is well known that when oxygen and carbon are brought together or combined heat is produced; but it is not known that the amount of these chemical properties in air and iron is the required quantity necessary to produce heat sufficient to carry out the practical refining of crude pig-iron; hence the prevailing opinion among iron-workers that a blast of cold air driven into a body of liquid iron would chill it. Therefore, when iron is worked in the finery or run-out fire, the presence of heat from other sources is deemed indispensable to prevent the chilling of the iron.

The finery or run-out fire is usually open on three sides, sometimes closed, except at top to receive the charge of coal and iron. A furnace or cupola to work iron under my new process must be constructed as close as possible to prevent loss of iron, which would occur on account of its violent boiling, during which particles are thrown up and adhere to the sides and top of the chamber, but which during the process are remelted and flow down to the mass in the bottom. In the finery or run-out this loss is frequently prevented by the iron being covered by fuel. It is also first charged with metal in a solid state. In my process the metal is taken in a fluid state. In the finery the iron is brought to a fluid state by mixing it with large quantities of fuel, and when melted falls to the bottom of the finery, where it is decarbonized by strong blasts of air in connection with the fluel. In my process no fluel of any kind is used or required, as I rely exclusively on the heat created or generated by the chemical union of oxygen in the air and carbon in the iron.

In the accompanying drawing, Figure 1 represents a vertical section of a cupola or furnace used in my process, being a close cylindrical chamber, with a flue, A, at top to carry off the carbonic-acid gas formed in decarbonizing the iron. B is a small opening to receive the charge of fluid iron. C C C are the tuyeres placed around the sides of the furnace, pointing downward at an angle such that they sweep about three-quarters (¾) of the bottom of the chamber, the muzzles of the tuyeres being about six inches above the bottom of the chamber. D is a tap-hole for letting out the metal when refined. The chamber should not exceed three or four times the space occupied by the fluid iron.

The blast is first let on into this chamber or cupola; then the fluid iron is poured in, which, by the cause herein efore described, commences a violent ebullition or boiling, which continues until the iron is sufficiently refined, when the tap-hole is opened and the metal let out.

I do not wish to be understood as claiming, broadly, the act of blowing blasts of air into molten iron, as that has been done in processes dissimilar to mine; but What I do claim, and desire to secure by Letters Patent, is—

Blowing blasts of air, either hot or cold, up and through a mass of liquid iron, (the oxygen in the air combining with the carbon in the iron causing a greatly-increased heat and ebullition in the fluid mass,) and decarbonizing and refinishing said iron without the use of fuel.

WILLIAM KELLY.

Witnesses:

C. F. JENKINS,

J. G. JEFFERSON.